Patented Jan. 7, 1941

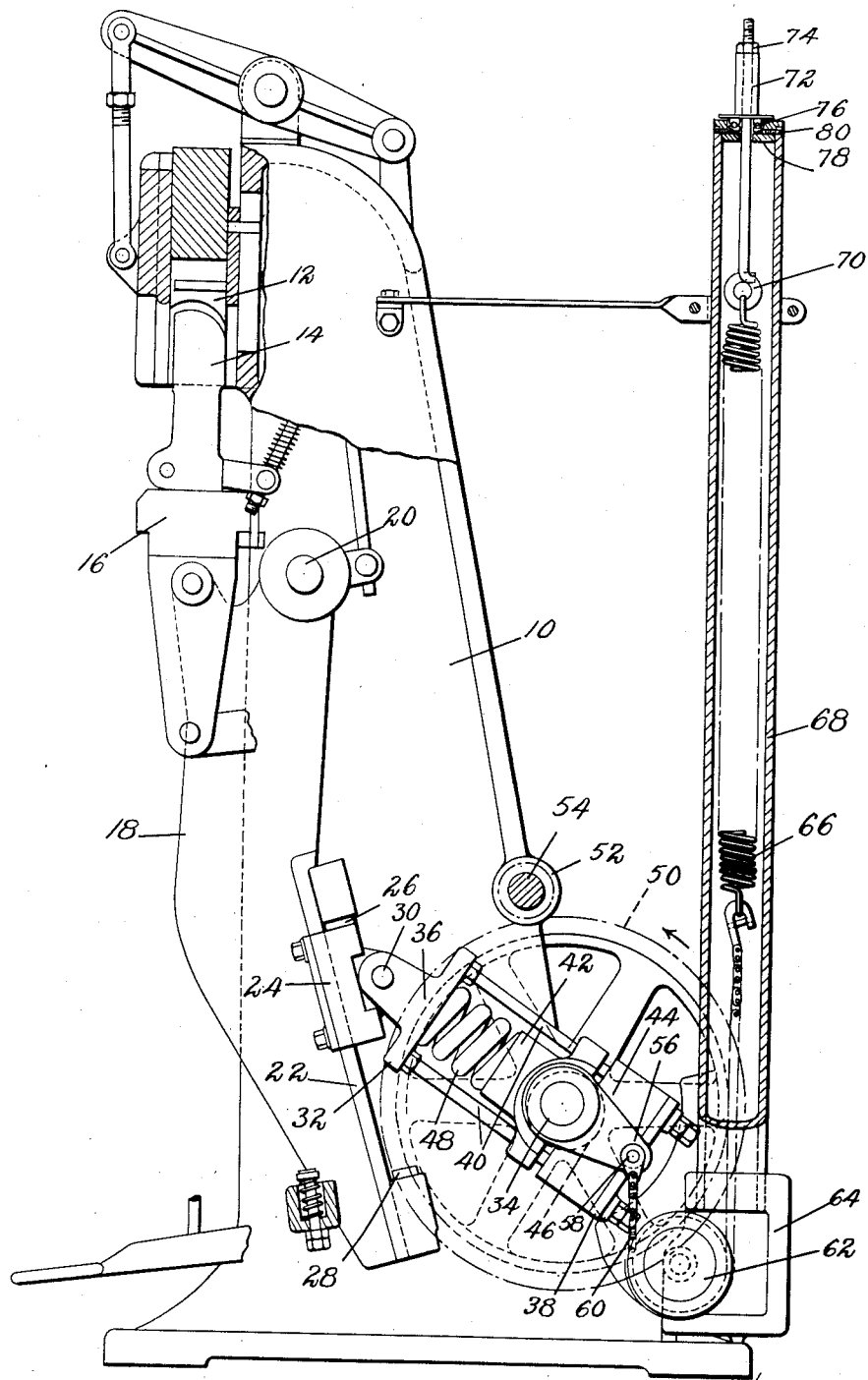

2,227,567

UNITED STATES PATENT OFFICE 2,227,567

COUNTER MOLDING MACHINE

Leslie Hugh Bennion, Leicester, England, assignor to United Shoe Machinery Corporation, Borough of Flemington, N. J., a corporation of New Jersey Application November 3, 1939, Serial No. 302,649
In Great Britain December 3, 1938

4 Claims. (Cl. 12—66)

This invention relates to machines for use in molding shoe parts and is herein illustrated as embodied in a counter molding machine of the type illustrated in United States Letters Patent No. 1,742,300, granted January 7, 1930, upon application filed in my name.

Machines of the type referred to commonly comprise male and female molds, the male mold being carried upon a support, which is forced toward the female mold by a heavy rocking lever, to which power is applied from a drive shaft through connections which include friction elements, the parts being returned by a spring to their original positions after each molding operation. In these machines as heretofore constructed, the spring is so arranged with relation to other operating parts that the tension of the spring increases the amount of friction to which the friction elements are subjected, thus greatly increasing the amount of power required to operate the machine over that which would be required if the spring were not used.

In view of the foregoing, it is an object of the invention to provide an improved counter molding machine of the type referred to, in which the pressure upon friction elements used in driving the machine is limited substantially to that necessary to cause the elements to operate in their normal manner. To this end, and as illustrated, the invention provides a counter molding machine, in which means for actuating a molding instrumentality is arranged to be driven from a drive shaft through connections including friction elements, there being resilient means connected to the drive shaft for returning the parts to their original positions after each molding operation has taken place. This construction is advantageous in that, since the means for returning the parts to their original positions is connected directly to the shaft, force applied by that means does not exert pressure upon the friction elements, with the result that much less power is required to drive the machine than would otherwise be the case.

These and other features of the invention are disclosed in the following specification and accompanying drawing, and are pointed out in the claims.

The figure of the drawing is a view in side elevation, partly in section, of a counter molding machine embodying my invention.

The illustrated counter molding machine comprises a frame 10, which carries molding instrumentalities comprising female molds 12 and a cooperating male mold 14. The male mold is supported upon a table 16, which is arranged to be moved, toward and away from the female molds in performing a blank-shaping or molding operation, by means of a rocking lever 18 mounted upon a pivot 20 on the frame.

The rocking lever 18 is arranged to be oscillated back and forth during the molding operation by power operated means. As shown, the lower end of the lever 18 is provided with an inclined guideway 22 upon which is mounted a block 24 slidable along the guideway between two stops 26 and 28 at the ends thereof. The block 24 carries a pin 30 connected to a link 32, which is operatively connected with a drive shaft 34. The link 32 comprises end pieces 36 and 38 and bolts 40 connecting the end pieces. Slidably mounted upon the bolts 40 between the end pieces are two friction blocks 42 and 44, which serve as an eccentric strap surrounding an eccentric 46 on the shaft 34, the blocks being forced into close engagement with the eccentric by means of a heavy spring 48 positioned between the under surface of the end piece 36 and the upper end of the block 42. The shaft 34 is driven by a gear 50 meshing with a pinion 52 on a main shaft 54, which is driven by any suitable power means, there being a clutch (not shown) for operatively connecting the main shaft to the power means. Upon rotation of the shaft 34 in a counterclockwise direction, the eccentric 46 through frictional engagement with the blocks 42 and 44, causes rotation of the link 32 in a counterclockwise direction, with the result that the sliding block 24 is moved downwardly, thus causing the rocking lever 18 to rock in a clockwise direction and thereby to force the male mold 14 toward the female molds 12. Downward movement of the block 24 is arrested by its engagement with the stop 28, after which, upon further rotation of the shaft 34, the high part of the eccentric will operate the link 32 to cause a further rocking movement of the lever 18 thereby to impart a final molding pressure to the male mold. In the event that excessive pressures are built up as, for example, when the molding operation is performed upon thick materials, the friction blocks 42 and 44 will slip relatively to the eccentric 46 and the spring 48 will yield slightly without applying further pressure to the lever 32 thus limiting the pressure applied to the lever 18 and avoiding likelihood of breakage of the machine parts.

For a more complete description of the machine and operation thus far set forth, reference may be had to the aforementioned Letters Patent.

After completion of the molding operation above described, it is desirable to return the male mold to its original position to permit insertion of a new piece of work. Accordingly, means is provided for rotating the shaft 34 and its associated parts in a clockwise direction after the clutch has been disengaged at the end of the molding operation.

To this end, I have provided a resilient means secured to the shaft for rotating it in a reverse direction. This means comprises a crank 56, secured to the shaft and having at its outer end a pin 58, to which is connected a chain 60. The chain 60 passes downwardly and around a pulley 62 carried by a bracket 64 on the machine frame, the other end of the chain being connected to a spring 66 extending upwardly through a tube 68 supported on the bracket 64. The upper end of the spring 66 is connected to a ring bolt 70, secured in fixed position at the upper end of the tube. The ring bolt is threaded at its upper end and passes through a sleeve 72 and a nut 74, the sleeve being seated upon a thrust bearing 76, which allows free rotation of the ring bolt and sleeve as the spring stretches or contracts. The bearing 76 is seated in a plug 78, which is held in position at the top of the tube by screws 80.

During the molding operation, when the shaft 34 is rotating in a counterclockwise direction, the crank 56 is rotated in the same direction and, acting through the chain 60, causes the spring 66 to stretch. However, since the spring is connected to the shaft 34, this does not result in any application of pressure to the friction blocks 42 and 44 and, consequently, the spring offers little resistance to rotation of the shaft. After the molding operation has been completed and the clutch disengaged, the spring 66 is effective to cause rotation of the shaft in a clockwise direction to effect movement of the sliding block 24 upwardly and movement of the lever 18 in a counterclockwise direction, thus to lower the male mold.

Having described my invention, what I claim as new and desire to secure by Letters Patent of the United States is:

1. A counter molding machine comprising a frame, a molding instrumentality movably mounted upon the frame, a rocking lever for causing movements of the molding instrumentality, a drive shaft, connections between the drive shaft and the rocking lever including friction elements for causing movement of the lever in one direction, and resilient means connected to the shaft independently of the friction elements for causing movement of the lever in the reverse direction.

2. A machine for molding shoe parts, comprising a frame, a molding instrumentality carried by the frame, a rocking lever for actuating the molding instrumentality, a drive shaft, an eccentric on the drive shaft, operative connections between the shaft and the rocking lever including friction elements engaging the eccentric and operable upon rotation of the drive shaft in one direction to effect an operation of the instrumentality upon a shoe part, a crank on the drive shaft, and a spring connected to the crank for rotating the drive shaft in the other direction to return the molding instrumentality to its original position.

3. A machine for shaping shoe parts, comprising a frame, a molding instrumentality movably mounted in the frame, means for causing operation of the instrumentality upon work presented to the machine comprising a drive shaft, connections between the drive shaft and the instrumentality including friction elements, and a spring operatively connected to the drive shaft for rotating the shaft in a direction to move the instrumentality into inoperative position after a molding operation.

4. A machine for operating upon shoe parts comprising a frame, pressure applying means mounted in the frame, means for causing operation of the pressure applying means upon work presented to the machine comprising a drive shaft, connections between the drive shaft and the pressure applying means including friction elements, and resilient means operatively connected to the drive shaft for rotating the shaft in a direction to move the pressure applying means into inoperative position after a pressure applying operation.

LESLIE HUGH BENNION.